United States Patent [19]

Smith et al.

[11] Patent Number: 5,185,420

[45] Date of Patent: * Feb. 9, 1993

[54] THERMOPLASTIC POLYURETHANE ELASTOMERS AND POLYUREA ELASTOMERS MADE USING LOW UNSATURATION LEVEL POLYOLS PREPARED WITH DOUBLE METAL CYANIDE CATALYSTS

[75] Inventors: Curtis P. Smith, Cheshire; Maurice C. Raes, Branford; John W. Reisch, Guilford; Kiran B. Chandalia, Cheshire; James M. O'Connor, Branford, all of Conn.

[73] Assignee: Olin Corporation, Cheshire, Conn.

[*] Notice: The portion of the term of this patent subsequent to Mar. 17, 2009 has been disclaimed.

[21] Appl. No.: 852,430

[22] Filed: Mar. 16, 1992

Related U.S. Application Data

[63] Continuation-in-part of Ser. No. 608,517, Nov. 2, 1990, Pat. No. 5,096,993.

[51] Int. Cl.$^5$ .............................................. C08G 18/10
[52] U.S. Cl. ........................................ 528/61; 528/64; 528/65; 528/66; 528/76
[58] Field of Search ...................... 528/61, 64, 65, 66, 528/76

[56] References Cited

U.S. PATENT DOCUMENTS

| | | | |
|---|---|---|---|
| 3,829,505 | 8/1974 | Herold | 260/611 |
| 4,202,957 | 5/1980 | Bonk et al. | 528/77 |
| 4,242,490 | 12/1980 | Emerson et al. | 528/77 |
| 4,376,834 | 3/1983 | Goldwasser et al. | 521/159 |
| 4,745,170 | 5/1988 | Bushman et al. | 528/61 |
| 5,096,993 | 3/1992 | Smith et al. | 528/61 |

*Primary Examiner*—Maurice J. Welsh
*Attorney, Agent, or Firm*—Dale Lynn Carlson

[57] ABSTRACT

This invention relates to a method of fabricating a thermoplastic elastomer which comprises the steps of: (a) fabricating a polyol having a molecular weight of between about 2,000 and about 8,000 and having a level of end group unsaturation of no greater than 0.02 milliequivalents per gram of polyol, said polyol being fabricated in the presence of a double metal cyanide catalyst, (b) reacting said polyol with a diisocyanate to produce an isocyanate-terminated prepolymer, and (c) reacting said isocyanate-terminated prepolymer with a difunctional isocyanato-reactive chain extender in a mold or in an extruder in order to produce an elastomer characterized by a hardness of between a Shore A hardness of about 50 and a Shore D hardness of about 65. Also claimed is the elastomer produced by the above method utilizing a one-shot technique.

20 Claims, No Drawings

THERMOPLASTIC POLYURETHANE ELASTOMERS AND POLYUREA ELASTOMERS MADE USING LOW UNSATURATION LEVEL POLYOLS PREPARED WITH DOUBLE METAL CYANIDE CATALYSTS

This application is a continuation-in-part of U.S. Ser. No. 07/608,517 filed Nov. 2, 1990 now U.S. Pat. No. 5,096,993.

FIELD OF THE INVENTION

The present invention relates generally to the production of thermoplastic polyurethane ("TPU") elastomers and polyurea elastomers and, more specifically, to the production of thermally stable elastomers utilizing low unsaturation level polyols prepared by double metal cyanide complex catalysis.

BACKGROUND OF THE INVENTION

The use of double metal cyanide catalysts in the preparation of high molecular weight polyols is well-established in the art. For example, General Tire & Rubber Company U.S. Pat. No. 3,829,505, discloses the preparation of high molecular weight diols, triols etc., using these catalysts. The polyols prepared using these catalysts can be fabricated to have a higher molecular weight and a lower amount of end group unsaturation than can be prepared using commonly-used KOH catalysts. The '505 patent discloses that these high molecular weight polyol products are useful in the preparation of nonionic surface active agents, lubricants and coolants, textile sizes, packaging films, as well as in the preparation of solid or flexible polyurethanes by reaction with polyisocyanates.

Certain thermoset polyurethane elastomers produced using triols made by DMC catalysis are also known. More specifically, U.S. Pat. No. 4,242,490 discloses the preparation of such elastomers by reacting a DMC catalyst-prepared polypropylene ether triol having a molecular weight of from 7,000 to 14,000, ethylene glycol, and toluene diisocyanate in a specified range of molar ratios using either a prepolymer process or a "one-shot" process.

Methodology for preparing TPU elastomers is well-established in the art. By way of illustration, U.S. Pat. No. 4,202,957 discloses polyurethane polyether-based elastomers, made using a select group of polypropylene oxide-polyethylene oxide block copolymers, which this patent states are thermoplastic, recyclable and possess high temperature degradation resistance thus permitting fabrication by injection molding.

Heretofore, the use of low unsaturation level polyols made with double metal cyanide catalysts in combination with chain extenders in the preparation of thermoplastic elastomers, particularly thermoplastic elastomers characterized by enhanced thermal stability, has not been known based upon the knowledge of the present inventor. The discovery of such thermally stable elastomers would be highly desired by the elastomer manufacturing community.

SUMMARY OF THE INVENTION

In one aspect, the present invention relates to a thermoplastic polyurethane or polyurea elastomer made by reacting in a "one-shot" process (preferably a continuous one-shot process) a polyether polyol, a diisocyanate, and a difunctional, isocyanato-reactive chain-extender, the polyether polyol being prepared utilizing a double metal cyanide complex catalyst and having a molecular weight of between about 2000 and about 8,000 (advantageously between 2,000 and 4,000), said polyol having an end group unsaturation level of no greater than 0.02 milliequivalents per gram of polyol, preferably no greater than 0.015 milliequivalents per gram of polyol, the equivalent ratio of NCO groups on said diisocyanate to active hydrogen groups on said polyol plus chain extender being between about 1:0.7 and about 1:1.3 (preferably between 1:0.9 and 0.9:1, more preferably between 1:0.95 and 0.95:1), and the molar ratio of chain extender to polyol being between about 0.15:1 and about 75:1.

In another aspect, the present invention relates to a thermoplastic polyurethane or polyurea elastomer made by reacting an isocyanate-terminated prepolymer with a difunctional isocyanato-reactive chain-extender, the isocyanate-terminated prepolymer being the reaction product of a polyisocyanate and a polyether polyol prepared utilizing a double metal cyanide complex catalyst and having a molecular weight of between about 2000 and about 8,000 (advantageously between 2,000 and 4,000), said polyol having an end group unsaturation level of no greater than 0.02 milliequivalents per gram of polyol, preferably no greater than 0.015 milliequivalents per gram of polyol, the equivalent ratio of NCO groups on said diisocyanate to active hydrogen groups on said polyol plus chain extender being between about 1:0.7 and about 1:1.3 (preferably between 1:0.9 and 0.9:1, more preferably between 1:0.95 and 0.95:1), and the molar ratio of chain extender to polyol being between about 0.15:1 and about 75:1.

In yet another aspect, the present invention relates to a method of fabricating a thermoplastic elastomer which comprises the steps of:
(a) fabricating a polyol having a molecular weight of between about 2,000 and about 8,000 (advantageously between 2,000 and 4,000) and having a level of end group unsaturation of no greater than 0.02 (preferably no greater than 0.015) milliequivalents per gram of polyol, said polyol being fabricated in the presence of a double metal cyanide catalyst,
(b) reacting said polyol with a diisocyanate to produce an isocyanate-terminated prepolymer, and
(c) reacting said isocyanate-terminated prepolymer with a difunctional isocyanato-reactive chain extender in a mold or in an extruder in order to produce an elastomer characterized by a hardness of between a Shore A hardness of about 50 and a Shore D hardness of about 65, with the proviso that when the molecular weight of the polyol is less than 4,000, then the polyol has an ethylene oxide content of less than 35 weight based upon the weight of the polyol.

These and other aspects will become apparent upon reading the following detailed description of the invention.

DETAILED DESCRIPTION OF THE INVENTION

It has now been surprisingly found in accordance with the present invention that thermoplastic elastomers having a hardness in the range of between a Shore A hardness of about 50 and a Shore D hardness of about 65 with excellent thermal stability properties, are produced utilizing polyols made with double metal cyanide complex catalysts. The elastomers are more physically stable against thermal degradation than are prior art polyols, such as so-called "PTMEG" (which is polytetramethylene ether glycol), and they exhibit excellent physical and chemical properties. The elastomers possess the hydrolytic stability commonly exhibited by polyether-based polyurethanes as well as excellent structural strength and stability characteristics. In addition, the elastomers are recyclable and can be remolded.

The thermoplastic elastomers of the present invention may be made by the prepolymer process or the one-shot process. The polyurethane isocyanate-terminated prepolymer that is utilized when employing the prepolymer process according to the invention is prepared by reacting an organic polyisocyanate with a polyalkylene ether polyol(s) in an equivalent ratio of NCO to OH groups of from about 15:1 and about 1.2:1 (preferably between 7:1 and 3:1), using standard procedures, to yield an isocyanate-terminated prepolymer of controlled molecular weight. The reaction may be accelerated by employing a catalyst. Common urethane catalysts are well known in the art and include numerous organometallic compounds as well as amines, e.g., tertiary amines and metal compounds such as lead octoates, mercuric succinates, stannous octoate or dibutyltin dilaurate may be used. Any catalytic amount may be employed; illustratively, such amount varies, depending on the particular catalyst utilized, from about 0.01 to about 2 percent by weight of the polyurethane prepolymer.

Preferred polyol reactants are the polyether diols and combinations thereof. Suitable polyether diols include various polyoxyalkylene diols and combinations thereof preferably containing ethylene oxide ("EO") in an amount of between about 5 and about 40, more preferably between about 15 and about 30, weight percent based upon the weight of the polyol. Suitable diols preferably have a primary hydroxyl content of between about 30 and about 95%, more preferably between about 50 and about 95%. The ethylenic unsaturation level for the polyol is preferably no greater than 0.02, more preferably less than 0.015, milliequivalents per gram of polyol. It is preferred that any residual alkali metal catalyst in the polyol be no greater than 25 ppm, more preferably no greater than 8 ppm, most preferably no greater than 5 ppm. The potential adverse effects of residual alkali metal catalyst in the polyol can be overcome by neutralizing with an effective amount of an acid, such as phosphoric acid.

The polyols can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the polyether diol reactant includes the following and mixtures thereof: ethylene glycol, diethylene glycol, propylene glycol, dipropylene glycol, butylene glycol, butane diols, pentane diols, water, combinations thereof, and the like.

The alkylene oxide-polyhydric initiator condensation reaction is preferably carried out in the presence of a double metal cyanide catalyst. Without wishing to be bound by any particular theory, it is speculated by the present inventor that unsaturated end groups result in monofunctional species that act as chain stoppers in elastomer formation. In polyol synthesis with KOH catalysis, the unsaturation formed increases as a direct function of equivalent weight. Eventually conditions are established wherein further propylene oxide addition fails to increase the molecular weight. In other words, the use of alkali catalysts to produce high molecular weight, hydroxy terminated polyoxypropylene ethers results in a substantial loss in hydroxy functionality. With double metal cyanide catalysis, much less unsaturation is formed allowing higher equivalent weight polyols to be prepared.

The double metal cyanide complex class catalysts suitable for use and their preparation are described in Shell Chemical Company U.S. Pat. No(s). 4,472,560 and 4,477,589 and The General Tire & Rubber Company U.S. Pat. No(s). 3,941,849; 4,242,490 and 4,335,188. The teachings of the foregoing patents are incorporated herein by reference.

One double metal cyanide complex catalyst found particularly suitable for use is a zinc hexacyanometallate of formula:

$$Zn_3[M(CN)_6]_2 \cdot xZnCl_2 \cdot yGLYME \cdot zH_2O$$

wherein M may be Co(III), or Cr(III) or Fe(II) Fe(III); x, y, and z may be fractional numbers, integers, or zero and vary depending on the exact method of preparation of the complex.

Any suitable organic diisocyanate, or mixture of diisocyanates, may be used in the elastomer-forming process of the present invention. Illustrative are toluene diisocyanate, such as the 80:20 and the 65:35 mixtures of the 2,4- and 2,6-isomers, ethylene diisocyanate, propylene diisocyanate, methylene-bis (4-phenyl) isocyanate (also referred to as diphenylmethane diisocyanate or MDI), dibenzyl diisocyanate, xylene diisocyanate (XDI), isophorone diisocyanate (IPDI), 3,3'-bistoluene-4,4'-diisocyanate, hexamethylene diisocyanate (HDI), hydrogenated MDI, hydrogenated XDI, cyclohexane diisocyanate, paraphenylene diisocyanate, mixtures and derivatives thereof, and the like. Other advantageous embodiments of the invention suitably employ an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20, as well as MDI.

Chain extenders useful in the present invention include diols and diamines such as ethylene glycol, diethylene glycol, propylene glycol, dipropylene glycol, butane diol, pentane diol, 3-methylpentane-1,5-diol, hexane diol, oxyalkylated hydroquinone, resorcinol and bisphenol A, hydrogenated bisphenol A, 1,4- cyclohexane dimethanol, or polyalkylene oxide diols with molecular weights between 100-500, diethyltoluene diamine, ethylene diamine, 4,4'-methylene bis(2-chloroaniline) ("MOCA"), hydrazine, substituted aromatic diamines such as the product commercially available as UNILINK 4200, a product of UOP, Inc, N,N-bis(2-hydroxypropyl)-aniline which is commercially available as ISONOL 100, a product of Dow Chemical Corp., and the like, and combinations thereof. The chain extension can be conducted either in situ during the prepolymer formation or in a separate reaction step.

In preparing the polyurethane and/or polyurea elastomer, the polyether polyol(s), polyisocyanate(s), chain extender(s), and other components are reacted, typically under conditions of an elevated temperature. A preferred method of forming the desired thermoplastic elastomers is by continuous processing utilizing an extruder as illustrated by U.S. Pat. No. 3,642,964, incorporated herein by reference in its entirety. An alternative method involves batch processing, followed by grinding and extrusion of the formed elastomer as is well-known in the art. Although either the prepolymer method or the one-shot method can be used, the one-shot method is preferred. The one-shot method is intended to also include the process whereby the diisocyanate has been converted to a quasi-prepolymer by reaction with a minor amount (i.e., less than about 10 percent on an equivalent basis) of polyol prior to carrying out the polyurethane forming reaction.

In preparing the elastomer, urethane forming catalysts can be used as well as the usual compounding ingredients such as antioxidants or other antidegradants. Typical antioxidants include hindered phenols, butylated hydroxytoluene ("BHT"), and the like. Other optional compounding ingredients include, for example, plasticizers, adhesion promoters, fillers and pigments like clay, silica, fumed silica, carbon black, talc, phthalocyanine blue or green, $TiO_2$, U-V absorbers, $MgCO_3$, $CaCO_3$ and the like. The compounding ingredients, such as fillers, are suitably employed in the elastomer in an amount of between 0 and about 75 weight percent based upon the weight of the elastomer. The polymerization reaction may be carried out in a single reaction (one-shot process), or in one or more sequential steps (prepolymer process), using either bulk polymerization or solution polymerization. When solution polymerization is used, polar solvents such as tetrahydrofuran ("THF"), dimethylformamide ("DMF"), and dimethylacetamide ("DMAC") are typically utilized. In the one-shot process, all the isocyanate-reactive components are reacted simultaneously with the polyisocyanate. In such process, it is normal practice to blend all components except the polyisocyanate into a "B-side" mixture, which is then reacted with the polyisocyanate to form the polyurethane and/or polyurea elastomer. However, the order of mixing is not critical as long as the components do not undesirably react before all components are present. The reaction mixture is usually then placed in a mold, or extruded through an extruder, and cured at a suitable temperature. The apparatus used for blending and molding is not especially critical. Hand mixing, conventional machine mixing, and the so-called reaction injection molding (RIM) equipment are all suitable. In the prepolymer process, all or a portion of one or more of the isocyanate reactive materials is reacted with a stoichiometric excess of the polyisocyanate to form an isocyanate-terminated prepolymer. This prepolymer is then allowed to react with the remaining isocyanate-reactive materials to prepare the polyurethane and/or polyurea elastomer. The prepolymer can be prepared with either the polyether or the chain extender, or a mixture of both.

The mixing of the reactants can be carried out at ambient temperature (of the order of 25° C.) and the resulting mixture is then heated to a temperature of the order of about 40° C. to about 130° C., preferably to a temperature of about 90° C. to about 120° C. Alternatively, and preferably, one or more of the reactants is preheated to a temperature within the above ranges before the admixing is carried out. Advantageously, in a batch procedure, the heated reaction components are subjected to degassing in order to remove entrained bubbles of air, water, or other gases before the reaction takes place. This degassing is accomplished conveniently by reducing the pressure under which the components are maintained until no further evolution of bubbles occurs. The degassed reaction components are then admixed and transferred to suitable molds or extrusion equipment or the like and cured at a temperature of the order of about 20° C. to about 115° C. The time required for curing will vary the temperature of curing and also with the nature of the particular composition, as is known in the art.

As used herein, the term "molecular weight" is intended to designate number average molecular weight.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

SPECIFIC EXAMPLES

I. preparation of High Molecular Weight Polyol with Low Unsaturation

A 2 gallon autoclave was filled with 550 g. of POLY-G ® 20-112, a polyoxypropylene diol of molecular weight 1000, and 2.2 g. of a double metal cyanide catalyst. The catalyst is a Zinc Cobaltihexacyanate complex with 1,2-dimethoxyethane (glyme). The reactor was closed, flushed three times with nitrogen and then heated to 100° C. At that time a total of 150 g. propylene oxide was added and after 20 min. the reaction started, as evidenced by a pressure drop. Then propylene oxide, 3850 g. was added over a period of 4 hrs. at a propylene oxide partial pressure of 30 psi.

When the pressure dropped to 10 psi. KOH, 16 g., was introduced into the reactor and then ethylene oxide, 680 g., was allowed to react at 70 psi for 5 hrs. The unreacted ethylene oxide was vented and the reactor cooled and opened up. To the reactor was added magnesium silicate, 100 g., and Supercell filter aid, 100 g. The contents of the autoclave were then heated to 100° C. for 2 hrs., after which time a vacuum of 25" water was applied for 1 hr. The polyol was then pushed through a small preheated filter press, containing a 5 micron paper filter, at 40 psi. and 100° C. Analysis showed that the polyol contained 9% ethylene oxide, had an OH # of 16 mg KOH/g. and had 70% primary OH. The unsaturation value was 0.0175 meq/g. and the Zn, Co and K contents were below 2 ppm.

II. Preparation of a Thermoplastic Polyurethane from a Low Unsaturation Containing High Molecular Weight Polyol (OH# 28.3, MW 3961)

In a preparation similar to I. above a polyol was prepared where analysis showed that the material contained 20% ethylene oxide and had an OH # of 28.3 mg KOH/g. The unsaturation value was 0.005 meq/g. and the residual KOH was 0.0 ppm.

A 2000 ml resin flask was charged with 1200 g., 0.303 moles, of the polyol. In addition, 1,4-butanediol, 84.43 g., 0.937 mole, and less than 1 wt % of a mixture of phenolic antioxidant, ester mold release and other processing aids were added. The mixture was dehydrated at 85° C. in vacuo, 1-2 mm Hg, for two hours after which time period 300 g. increments were weighed out and placed in a 90° C. oven prior to mixing with the appropriate isocyanate.

Reaction with Diphenylmethane diisocyanate

Diphenylmethane diisocyanate, MDI, 73.BB g., 0.295 mole, was weighed out and maintained at 90° C. prior to mixing. To prepare the thermoplastic polyurethane stannous octoate, 0.05–0.10 g., was added to the polyol and mixed. The MDI was then added and the mixture rapidly stirred until it thickens (15–20 sec) at which point it is then poured into a Teflon ® coated pan and allowed to cure. After curing the elastomer is granulated, dried at 100° C. and 0.3 mm Hg for 14–18 hrs. The dried polymer is extruded into a tape and specimens for tensile, die C and split tear were die cut from the extruded tape and tested after standing 5 days at ambient temperature.

An elastomer of 69 Shore A hardness and 4145 psi tensile strength at break is obtained.

Preparation of a Thermoplastic Polyurethane from a Low Unsaturation Containing Polyol (OH# 50.1 MW 2240)

In a preparation similar to I. above a polyol was prepared where analysis showed that the material contained 24.6% ethylene oxide, 75.6% primary OH and had an OH # of 50.1 mg KOH/g. The unsaturation value was 0.007 meq/g. and the KOH residue was 0.20 ppm.

30% Hard Segment—1,4-Butanediol

A 2000 ml resin flask was charged with 1100 g., 0.491 moles, of the polyol. In addition, 1,4-butanediol, 138.8 g., 1.54 mole, and less than 1 wt % of a mixture of phenolic antioxidant, ester mold release and other processing aids were added. The mixture was dehydrated at 85° C. in vacuo, 1-2 mm Hg, for two hours after which time period 300 g. increments were weighed out and placed in a 90° C. oven prior to mixing with the isocyanate.

Reaction with Diphenylmethane Diisocyanate

Diphenylmethane diisocyanate, MDI, 125.5 g., 0.502 mole, increments were weighed out and maintained at 90° C. prior to mixing. To prepare the thermoplastic polyurethane stannous octoate, 0.14–0.18 g. were added to the polyol samples and mixed. The MDI was then added and the mixture rapidly stirred until it thickens (10–15 sec) at which point it is then poured into a Teflon ® coated pan and allowed to cure. After curing the elastomer is granulated, dried at 100° C. and 0.3 mm Hg for 14–18 hrs. The dried polymer is compression molded at 420° F. Specimens for tensile, die C and split tear were die cut from the molded plaques after standing 5 days at ambient temperature.

An elastomer of 79 Shore A hardness and 5512 psi tensile strength at break is obtained.

40% Hard Segment—1,4-Butanediol

A 2000 ml resin flask was charged with 1050 g., 0.469 moles, of the polyol. In addition, 1,4-butanediol, 206.1 g., 2.29 mole, and less than 1 wt % of a mixture of phenolic antioxidant, ester mold release and other processing aids were added. The mixture was dehydrated at 85° C. in vacuo, 1-2 mm Hg, for two hours after which time period 300 g. increments were weighed out and placed in a 90° C. oven prior to mixing with the isocyanate.

Reaction with Diphenylmethane Diisocyanate

Diphenylmethane diisocyanate, MDI, 167.9 g., 0.671 mole, increments were weighed out and maintained at 90° C. prior to mixing. To prepare the thermoplastic polyurethane stannous octoate, 0.05–0.10 g. were added to the polyol samples and mixed. The MDI was then added and the mixture rapidly stirred until it thickens (10–18 sec) at which point it is then poured into a Teflon ® coated pan and allowed to cure. After curing the elastomer is granulated, dried at 100° C. and 0.3 mm Hg for 14–18 hrs. The dried polymer is compression molded at 420° F. Specimens for tensile, die C and split tear were die cut from the molded plaques after standing 5 days at ambient temperature.

An elastomer of 88 Shore A hardness and 4574 psi tensile strength at break is obtained.

50% Hard Segment—1,4-Butanediol

A 2000 ml resin flask was charged with 950 g., 0.424 moles, of the polyol. In addition, 1,4-butanediol, 279.6 g., 3.10 mole, and less than 1 wt % of a mixture of phenolic antioxidant, ester mold release and other processing aids were added. The mixture was dehydrated at 85° C. in vacuo, 1-2 mm Hg, for two hours after which time period 300 g. increments were weighed out and placed in a 90° C. oven prior to mixing with the isocyanate.

Reaction with Diphenylmethane Diisocyanate

Diphenylmethane diisocyanate, MDI, 219.6 g., 0.877 mole, increments were weighed out and maintained at 90° C. prior to mixing. To prepare the thermoplastic polyurethane stannous octoate, 0.02–0.10 g. were added to the polyol samples and mixed. The MDI was then added and the mixture rapidly stirred until it thickens (15–20 sec) at which point it is then poured into a Teflon ® coated pan and allowed to cure. After curing the cast polymer exhibited a Shore hardness of 93–95A. The cured elastomer is granulated, dried at 100° C. and 0.3 mm Hg for 14–18 hrs. The dried polymer is extruded into a tape and specimens for tensile, die C and split tear were die cut from the extruded tape and tested after standing 5 days at ambient temperature.

An elastomer of 95 Shore A hardness and 5358 psi tensile strength at break is obtained.

30Hard Segment—1,6-Hexanediol

A 2000 ml resin flask was charged with 1050 g., 0.469 moles, of the polyol. In addition, 1,6-hexanediol, 160.5 g., 1.36 mole, and less than 1 wt % of a mixture of phenolic antioxidant, ester mold release and other processing aids were added. The mixture was dehydrated at 85° C. in vacuo, 1-2 mm Hg, for two hours after which time period 300 g. increments were weighed out and placed in a 90° C. oven prior to mixing with the isocyanate.

Reaction with Diphenylmethane Diisocyanate

Diphenylmethane diisocyanate, MDI, 115.5 g., 0.462 mole, increments were weighed out and maintained at 90° C. prior to mixing. To prepare the thermoplastic polyurethane stannous octoate, 0.08–0.12 g. were added to the polyol samples and mixed. The MDI was then added and the mixture rapidly stirred until it thickens (10–20 sec) at which point it is then poured into a Teflon ® coated pan and allowed to cure. After curing the elastomer is granulated, dried at 100° C. and 0.3 mm Hg for 14-18 hrs. The dried polymer is compression molded at 420° F. Specimens for tensile, die C and split tear were die cut from the molded plaques after standing 5 days at ambient temperature.

An elastomer of 78 Shore A hardness and 4734 psi tensile strength at break is obtained.

In a similar manner elastomers containing 40%, 50%, and 60% hard segment levels were prepared.

Summary of Physical Properties for Elastomers Prepared Above

| Chain Ex- tender | % Hard Segment | Hard- ness | Tens. 100% | Mod. 300% | Ulti- mate Tensile | Ultimate Elongation |
|---|---|---|---|---|---|---|
| 1,4-BD | 30 | 79 A | 900 | 1667 | 5512 | 655% |
| 1,4-BD | 40 | 88 A | 1532 | 2382 | 4574 | 600% |
| 1,4-BD | 50 | 95 A | 1833 | 2902 | 5358 | 485% |
| 1,6-HD | 30 | 78 A | 588 | 1097 | 4734 | 665% |

III. Comparison Examples—Preparation of a Thermoplastic Polyurethane From Polytetramethylene Ether Glycol (PTMEG)

Comparison Using a PTMEG Compound

A 2000 ml resin flask was charged with 1200 g., 0.583 moles, of the TERATHANE 2000 PTMEG polyol, a product of E. I. Dupont Co. In addition, 1,4-butanediol, 48.58 g., 0.539 mole, and less than 1 wt % of a mixture of phenolic antioxidant, ester mold release, triphenyl phosphite were added. The mixture was dehydrated at 90° C. in vacuo, 1-2 mm Hg, for two hours after which time period 300 g. increments were weighed out and placed in a 90° C. oven prior to mixing with the isocyanate.

Reaction with Diphenylmethane Diisocyanate

Diphenylmethane diisocyanate, MDI, 68.79 g., 0.275 mole, increments were weighed out and maintained at 90° C. prior to mixing. To prepare the thermoplastic polyurethane stannous octoate, 0.05-0.10 g. were added to the polyol samples and mixed. The MDI was then added and the mixture rapidly stirred until it thickens (20-25 sec) at which point it is then poured into a Teflon ® coated pan and allowed to cure. After curing the elastomer is granulated, dried at 100° C. and 0.3 mm Hg for 14-18 hrs. The dried polymer is extruded into a tape and specimens for tensile, die C and split tear were die cut from the extruded tape and tested after standing 5 days at ambient temperature.

An elastomer of 68 Shore A hardness and 5990 psi tensile strength is obtained.

Comparison Using Another PTMEG Compound

A 2000 ml resin flask was charged with 1200 g., 1.211 moles, of the TERATHANE 1000, another Dupont PTMEG polyol. In addition, 1,4-butanediol, 37.20 g., 0.413 mole, and less than 1 wt % of a mixture of phenolic antioxidant, ester mold release, triphenyl phosphite were added. The mixture was dehydrated at 90° C. in vacuo, 1-2 mm Hg, for two hours after which time period 300 g. increments were weighed out and placed in a 90° C. oven prior to mixing with the isocyanate.

Reaction with Diphenylmethane Diisocyanate

Diphenylmethane diisocyanate, MDI, 100.45 g., 0.402 mole, increments were weighed out and maintained at 90° C. prior to mixing. To prepare the thermoplastic polyurethane stannous octoate, 0.05-0.10 g. were added to the polyol samples and mixed. The MDI was then added and the mixture rapidly stirred until it thickens (10-15 sec) at which point it is then poured into a Teflon ® coated pan and allowed to cure. After curing the elastomer is granulated, dried at 100° C. and 0.3 mm Hg for 14-18 hrs. The dried polymer is extruded into a tape and specimens for tensile, die C and split tear were die cut from the extruded tape and tested after standing 5 days at ambient temperature.

An elastomer of 65 Shore A hardness and 2839 psi tensile strength is obtained.

IV. Thermal Stability of Low Unsaturation Containing POLY-L Elastomers Compared with PTMEG Containing Elastomers Thermal Stability Tensile specimens of comparable hardness materials were subjected to thermal aging at 130° C. for 7 days in a circulating air oven. The data summarized in the Table show the benefit of the low unsaturation containing polyols in this application. The specimens of the two PTMEG materials did not survive the test, they were converted into brown blobs that could not be tested. In contrast, the poly-L-based thermoplastic polyurethanes maintained their integrity and the thermally aged elastomers were tested on an Instron. The tensile and elongation data before and after thermal aging are detailed below. Note that the elastomers prepared using the PTMEG compounds decomposed in the heat aging test, whereas the elastomers made using the process of the present invention and employing a polyol (PL-255-28) prepared using a DMC catalyst suffered some losses of properties but did not decompose.

| Polyol | Hard- ness | Test | Modulus 100% | Modulus 300% | Ulti- mate Tensile | Ulti- mate Elon- gation |
|---|---|---|---|---|---|---|
| PTMEG- 1000 | 65 | Thermal | — | (Sample Decomposed) | | — |
| | | Control | 248 | 336 | 2839 | 707 |
| | | % Change | — | (Sample Decomposed) | | — |
| PTMEG- 2000 | 68 | Thermal | — | (Sample Decomposed) | | — |
| | | Control | 414 | 687 | 5990 | 642 |
| | | % Change | — | (Sample Decomposed) | | — |
| PL 255-28 | 69 | Thermal | 233 | 572 | 850 | 670 |
| | | Control | 530 | 865 | 2001 | 993 |
| | | % Change | −56 | −34 | −57 | −32 |

What is claimed is:

1. A thermoplastic polyurethane or polyurea elastomer made by reacting in a "one-shot" process a polyether polyol, a diisocyanate, and a difunctional, isocyanato-reactive chain-extender, the polyether polyol being prepared utilizing a double metal cyanide complex catalyst and having a molecular weight of between about 2000 and about 8,000, said polyol having an end group unsaturation level of no greater than 0.02 milliequivalents per gram of polyol, the equivalent ratio of NCO groups on said diisocyanate to active hydrogen groups on said polyol plus chain extender being between about 1:0.7 and about 1:1.3, and the molar ratio of chain extender to polyol being between about 0.15:1 and about 75:1.

2. The elastomer of claim 1 wherein said chain extender is selected from the group consisting of diols, diamines, and combinations thereof.

3. The elastomer of claim 1 wherein said chain extender is selected from the group consisting of ethylene glycol, diethylene glycol, propylene glycol, dipropylene glycol, butane diol, pentane diol, 3-methylpentane-1,5-diol, hexane diol, oxyalkylated hydroquinone, resorcinol and bisphenol A, hydrogenated bisphenol A, 1,4-cyclohexane dimethanol, polyalkylene oxide diols with molecular weights between 100–500, diethyltoluene diamine, ethylene diamine, 4,4'-methylene bis(2-chloroaniline) ("MOCA"), hydrazine, substituted aromatic diamines, N,N-bis(2-hydroxypropyl)-aniline, and combinations thereof.

4. The elastomer of claim 1 which additionally contains at least one compounding ingredient selected from the group consisting of anti-oxidants, plasticizers, uv stabilizers, adhesion promoters, fillers and pigments and employed in an amount of between 0 and about 75 weight percent based upon the total weight of the composition.

5. The elastomer of claim 1 wherein said polyol has a molecular weight of between 2,000 and 4,000.

6. The elastomer of claim 1 wherein said polyol has an ethylene oxide content of less than 35 weight percent if the molecular weight of said polyol is less than 4,000.

7. A thermoplastic polyurethane or polyurea elastomer made by reacting an isocyanate-terminated prepolymer with a difunctional isocyanato-reactive chain-extender, the isocyanate-terminated prepolymer being the reaction product of a polyisocyanate and a polyether polyol prepared utilizing a double metal cyanide complex catalyst and having a molecular weight of between about 2000 and about 8,000, said polyol having an end group unsaturation level of no greater than 0.02 milliequivalents per gram of polyol, the equivalent ratio of NCO groups on said diisocyanate to active hydrogen groups on said polyol plus chain extender being between about 1:0.7 and about 1:1.3, and the molar ratio of chain extender to polyol being between about 0.15:1 and about 75:1.

8. The elastomer of claim 7 wherein said chain extender is selected from the group consisting of diols, diamines, and combinations thereof.

9. The elastomer of claim 7 wherein said chain extender is selected from the group consisting of ethylene glycol, diethylene glycol, propylene glycol, dipropylene glycol, butane diol, pentane diol, 3-methylpentane-1,5-diol, hexane diol, oxyalkylated hydroquinone, resorcinol and bisphenol A, hydrogenated bisphenol A, 1,4-cyclohexane dimethanol, polyalkylene oxide diols with molecular weights between 100–500, diethyltoluene diamine, ethylene diamine, 4,4'-methylene bis(2-chloroaniline) ("MOCA"), hydrazine, substituted aromatic diamines, N,N-bis(2-hydroxypropyl)-aniline, and combinations thereof.

10. The elastomer of claim 7 which additionally contains at least one compounding ingredient selected from the group consisting of anti-oxidants, plasticizers, uv stabilizers, adhesion promoters, fillers and pigments and employed in an amount of between 0 and about 75 weight percent based upon the total weight of the composition.

11. The elastomer of claim 7 wherein said polyol has a molecular weight of between 2,000 and 4,000.

12. The elastomer of claim 7 wherein said polyol has an ethylene oxide content of less than 35 weight percent if the molecular weight of said polyol is less than 4,000.

13. A method of fabricating a thermoplastic elastomer which comprises the steps of:
 (a) fabricating a polyol having a molecular weight of between about 2,000 and about 8,000 and having a level of end group unsaturation of no greater than 0.02 milliequivalents per gram of polyol, said polyol being fabricated in the presence of a double metal cyanide catalyst,
 (b) reacting said polyol with a diisocyanate to produce an isocyanate-terminated prepolymer, and
 (c) reacting said isocyanate-terminated prepolymer with a difunctional isocyanato-reactive chain extender in a mold or in an extruder in order to produce an elastomer characterized by a hardness of between a Shore A hardness of about 50 and a Shore D hardness of about 65, with the proviso that when the molecular weight of the polyol is less than 4,000, then the polyol has an ethylene oxide content of less than 35 weight based upon the weight of the polyol.

14. The method of claim 13 wherein said chain extender is selected from the group consisting of diols, diamines, and combinations thereof.

15. The method of claim 13 wherein said chain extender is selected from the group consisting of ethylene glycol, diethylene glycol, propylene glycol, dipropylene glycol, butane diol, pentane diol, 3-methylpentane-1,5-diol, hexane diol, oxyalkylated hydroquinone, resorcinol and bisphenol A, hydrogenated bisphenol A, 1,4-cyclohexane dimethanol, polyalkylene oxide diols with molecular weights between 100–500, diethyltoluene diamine, ethylene diamine, 4,4'-methylene bis(2-chloroaniline) ("MOCA"), hydrazine, substituted aromatic diamines, N,N-bis(2-hydroxypropyl)-aniline, and combinations thereof.

16. The method of claim 13 wherein said polyol has a molecular weight of between 2,000 and 4,000.

17. The method of claim 13 which additionally contains at least one compounding ingredient selected from the group consisting of anti-oxidants, plasticizers, uv stabilizers, adhesion promoters, fillers and pigments.

18. The method of claim 17 wherein said compounding ingredient is employed in an amount of between 0 and about 75 weight percent based upon the total weight of the composition.

19. The method of claim 13 wherein steps (b) and (c) are conducted simultaneously.

20. The method of claim 13 wherein said end group unsaturation in no greater than 0.015 milliequivalents per gram of polyol.

* * * * *